US011343325B2

(12) United States Patent
Rossi et al.

(10) Patent No.: US 11,343,325 B2
(45) Date of Patent: May 24, 2022

(54) SYSTEMS AND METHODS FOR ESTIMATING TYPED GRAPHLETS IN LARGE DATA

(71) Applicant: Adobe Inc., San Jose, CA (US)

(72) Inventors: Ryan Rossi, Santa Clara, CA (US); Tung Mai, San Jose, CA (US); Anup Rao, San Jose, CA (US)

(73) Assignee: Adobe Inc., San Jose, CA (US)

( * ) Notice: Subject to any disclaimer, the term of this patent is extended or adjusted under 35 U.S.C. 154(b) by 24 days.

(21) Appl. No.: 17/008,339

(22) Filed: Aug. 31, 2020

(65) Prior Publication Data
US 2022/0070266 A1 Mar. 3, 2022

(51) Int. Cl.
G06F 15/173 (2006.01)
H04L 67/141 (2022.01)
G06F 17/18 (2006.01)
G06F 16/901 (2019.01)

(52) U.S. Cl.
CPC ........ H04L 67/141 (2013.01); G06F 16/9024 (2019.01); G06F 17/18 (2013.01)

(58) Field of Classification Search
CPC ..... H04L 67/141; G06F 16/9024; G06F 17/18
See application file for complete search history.

(56) References Cited

U.S. PATENT DOCUMENTS

| 10,217,241 | B2 | 2/2019 | Rossi et al. | |
| 10,235,182 | B2 | 3/2019 | Rossi et al. | |
| 10,482,375 | B2* | 11/2019 | Rossi | G06K 9/6232 |
| 2014/0012905 | A1* | 1/2014 | Roche | H04L 65/00 709/204 |
| 2016/0134578 | A1* | 5/2016 | Ross | H04L 67/22 709/206 |
| 2017/0068861 | A1* | 3/2017 | Miller | G06K 9/00785 |
| 2017/0286539 | A1 | 10/2017 | Smith et al. | |
| 2017/0357905 | A1* | 12/2017 | Rossi | G06N 7/005 |
| 2018/0034900 | A1* | 2/2018 | Kamiyama | H04L 67/1097 |
| 2019/0258807 | A1* | 8/2019 | DiMaggio | G06N 20/00 |
| 2020/0034710 | A1* | 1/2020 | Sidhu | G06N 3/0454 |

OTHER PUBLICATIONS

Anonymous Author(s). 2020.Fast and Accurate Estimation of Typed Graphlets. In Companion Proceedings of the Web Conference 2020 (WWW '20 Companion), Apr. 20-24, 2020, Taipei, Taiwan. ACM, New York, NY, USA, 3 pages.
Ryan A. Rossi et al., "Heterogeneous Network Motifs," arXiv:1901. 10026v3 [cs.SI] May 11, 2019.

* cited by examiner

Primary Examiner — Razu A Miah
(74) Attorney, Agent, or Firm — FIG. 1 Patents

(57) ABSTRACT

A system and method for fast, accurate, and scalable typed graphlet estimation. The system and method utilizes typed edge sampling and typed path sampling to estimate typed graphlet counts in large graphs in a small fraction of the computing time of existing systems. The obtained unbiased estimates of typed graphlets are highly accurate, and have applications in the analysis, mining, and predictive modeling of massive real-world networks. During operation, the system obtains a dataset indicating nodes and edges of a graph. The system samples a portion of the graph and counts a number of graph features in the sampled portion of the graph. The system then computes an occurrence frequency of a typed graphlet pattern and a total number of typed graphlets associated with the typed graphlet pattern in the graph.

20 Claims, 14 Drawing Sheets

TABLE 1: MEAN RELATIVE ERROR OF TYPED GRAPHLET ESTIMATES.
(SETTING k=50000 AND PERFORMING 100 RUNS.)

| DATA | METHODS | ⋮ | Y | □ | ⊠ | ⊠ |
|---|---|---|---|---|---|---|
| fb-POLITICAL | TES | 0.012 | 0.033 | 0.036 | 0.036 | 0.070 |
|  | TPS | 0.002 | 0.021 | 0.010 | 0.024 | 0.034 |
| YAHOO-msg | TES | 0.774 | 0.867 | 1.233 | 2.784 | 0.430 |
|  | TPS | 0.001 | 0.046 | 0.003 | 0.270 | 0.025 |
| WEB-POLBLOGS | TES | 0.010 | 0.083 | 0.011 | 0.100 | 0.164 |
|  | TPS | 0.002 | 0.006 | 0.005 | 0.007 | 0.008 |
| SOC-WIKI-ELEC | TES | 0.684 | 1.160 | 0.788 | 1.353 | 1.552 |
|  | TPS | 0.002 | 0.003 | 0.003 | 0.005 | 0.008 |
| SOC-DIGG | TES | 0.460 | 0.412 | 0.890 | 0.713 | 1.474 |
|  | TPS | <10⁻³ | 0.004 | 0.003 | 0.006 | 0.011 |

*FIG. 7A*

TABLE 2: TYPED GRAPHLET ESTIMATES AND RELATIVE ERROR
(SETTING $k = 50000$ FOR TYPED 4-CLIQUES)

| GRAPH | TYPES | C | $\hat{C}$ | | $\frac{|C - \hat{C}|}{C}$ | | Std | |
|---|---|---|---|---|---|---|---|---|
| | | | TES | TPS | TES | TPS | TES | TPS |
| fb-POLITICAL | 1111 | 8.14K | 7.35K | 8.37K | 0.0973 | 0.0288 | 5K | 507 |
| | 2111 | 7.64K | 8.13K | 7.86K | 0.0634 | 0.0285 | 3.4K | 545 |
| | 2211 | 6.27K | 6.85K | 6.50K | 0.0924 | 0.0371 | 2.6K | 448 |
| | 2221 | 6.12K | 6.55K | 6.29K | 0.0701 | 0.0281 | 2.3K | 455 |
| | 2222 | 4.46K | 4.59K | 4.68K | 0.0274 | 0.0483 | 2.4K | 462 |

*FIG. 7B*

TABLE 3: MEAN RELATIVE ERROR OF TYPED GRAPHLET ESTIMATES. RESULTS FROM LARGE-SCALE VISITOR STITCHING WEB LOG DATASETS. (SETTING k=500,000 AND PERFORMING 100 RUNS.)

| DATA | METHODS |  |  |  |  |  |
|---|---|---|---|---|---|---|
| ADOBE WEB LOGS | TES | 0.026 | - | 0.079 | - | - |
|  | TPS | 0.001 | - | 0.013 | - | - |
| MS WEB LOGS | TES | 0.297 | - | 0.682 | - | - |
|  | TPS | 0.004 | - | 0.185 | - | - |

NOTE "-" INDICATES THERE ARE NO TYPED GRAPHLETS USING THAT INDUCED SUBGRAPH IN THE DATA.

SYSTEMS AND METHODS FOR ESTIMATING TYPED GRAPHLETS IN LARGE DATA

TECHNICAL FIELD

The present disclosure relates to estimating typed graphlets in large data. More specifically, this disclosure relates to methods and systems for estimating typed graphlets in heterogeneous networks based on neighborhood sampling and combinatorial relations.

BACKGROUND

Graphs (i.e., networks) are representations of edges that connect a set of nodes. Counting the number of occurrences of small subgraphs in a graph is a fundamental network analysis technique used across diverse domains, such as in bioinformatics, social sciences, consumer-product relationships, and infrastructure networks. The subgraphs whose counts are desired are variously referred as "pattern subgraphs," "motifs," or "graphlets." It is repeatedly observed that certain graphlets occur substantially more often in real-world networks than in a randomly generated network. These graphlets are considered to be the fundamental building blocks of simple homogeneous networks and are essential for modeling and understanding the fundamental components of these networks.

However, such "untyped" graphlets are unable to capture the rich connectivity patterns in more complex networks such as those that are heterogeneous (e.g., "typed" graphlets). Many real-world applications give rise to large heterogeneous networks where nodes and edges can be of any arbitrary type (e.g., user, web page, location, etc.). Typed graphlets are thus considered to be the fundamental building blocks of these complex heterogeneous networks.

Despite their fundamental and practical importance, counting typed graphlets in large datasets remains a challenge due to combinatorial explosion. Existing methods to count higher-order subgraph patterns do not scale, and have mostly focused on small biological and social networks containing small numbers of vertices and edges. Even extremely small networks with hundreds or thousands of nodes and edges have reported runtimes that exceed days.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

Embodiments of the present disclosure involve neural networks for estimating instances of typed graphlets in graphs representing large data. One embodiment of the present disclosure provides a system and method for estimating a number of typed graphlets in the graph. During operation, the system obtains a dataset which may include a set of entities corresponding to nodes in a graph. The dataset may further include connections among the set of entities corresponding to edges connecting the nodes in the graph. The dataset may further include for an entity in the set of entities, and for a connection among the set of entities, features corresponding to attributes of the node and of the edges, respectively. The system may sample a portion of the graph that includes two or more nodes and at least one edge. The system may determine a number of graph features in the sampled portion of the graph. The system may then determine an occurrence frequency of a typed graphlet pattern in the sampled portion of the graph. Based on the determined occurrence frequency of the typed graphlet pattern, the system may then determine an estimation of a total number of typed graphlets in the graph.

In a variation on this embodiment, the sampled portion of the graph may comprise an edge neighborhood associated with a typed edge that connects a first node to a second node. The number of graph features in the sampled portion of the graph may comprise a number of typed paths including the first node, the second node, and a third node within the edge neighborhood. Determining the total number of typed graphlets may involve scaling up the occurrence frequency of the typed graphlet pattern to obtain an unbiased statistical estimation of the total number of typed graphlets.

In a variation on this embodiment, the graph may be a heterogeneous graph, such as a signed graph, a labeled graph, a bipartite graph, a k-partite graph, a k-star graph, and an attributed graph. The dataset may include a device graph dataset, a citation dataset, a bioinformatics dataset, a social network dataset, and a financial transaction dataset. The features representable by attributes of corresponding nodes and of corresponding edges in the graph may include information relating to a user, a user name, a real name, an affinity of a user, a biography of a user, commercial proclivities of a user, a location, an image, a pointer to a storage location of an image, a webpage, social media content, metadata relating to system activities of a user, and a user alias.

In a variation on this embodiment, the typed graphlet pattern in the sampled portion of the graph may include typed 3-paths with two or more types, typed 4-cycles with two or more types, and typed 4-cliques with two or more types. The graph features in the sampled portion of the graph may include a typed edge that connects a first node to a second node, and may further include a typed path such as a 4-mode motif. The system may implement typed graphlet estimation in parallel, taking advantage of the independence of edge neighborhoods. The sampled portion of the graph may include a set of multiple sampled typed paths. Sampling the portion of the graph may involve assigning a respective sampled typed path to a respective processor in a set of processors.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 7A lists mean relative error values of typed graphlet estimates obtained by systems and methods disclosed herein, based on experimental results.

FIG. 7B lists typed graphlet estimates and relative error values obtained by systems and methods disclosed herein, based on experimental results.

DETAILED DESCRIPTION

Figure 1A:
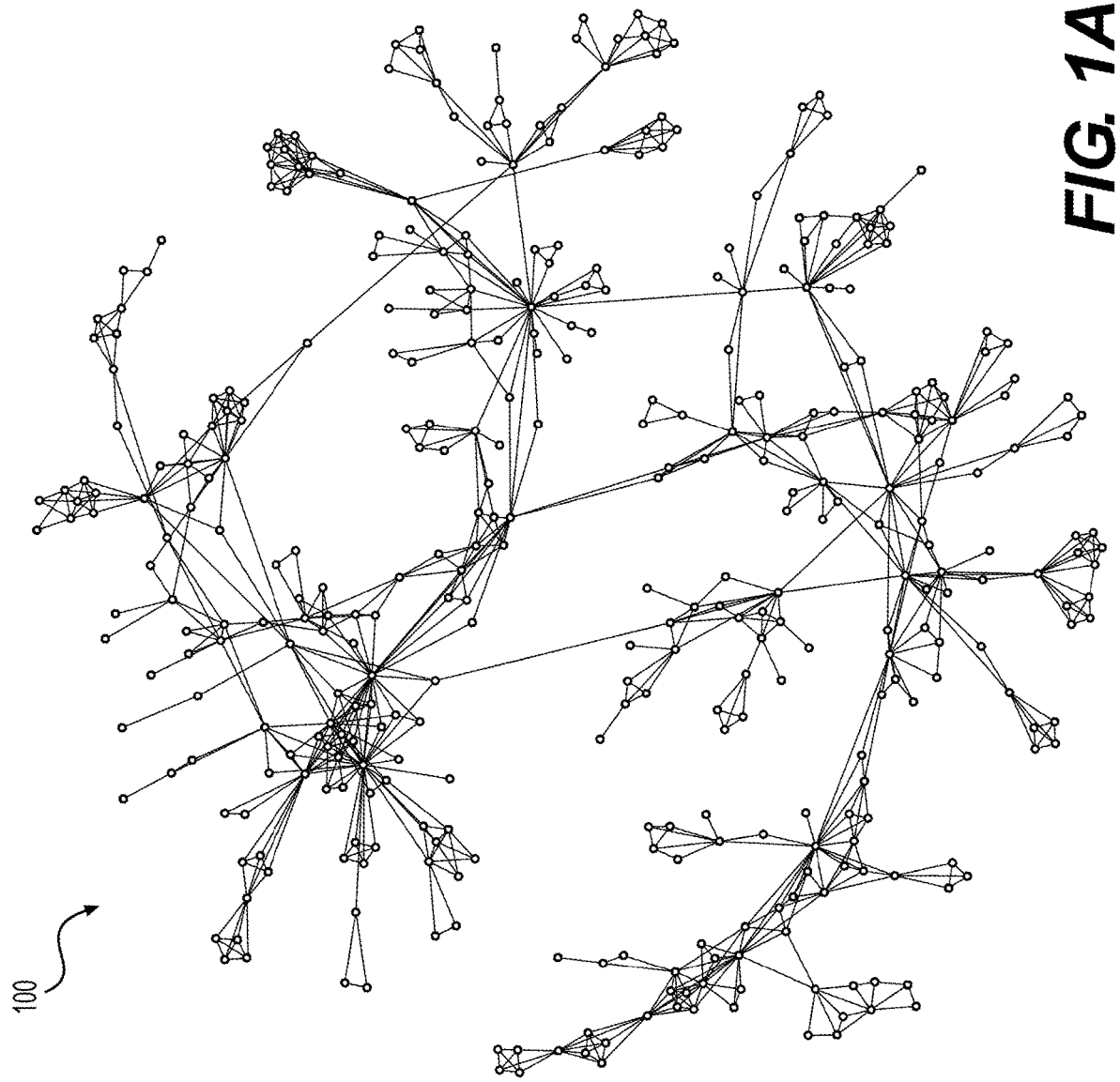
FIG. 1A illustrates an example of a graph within which the computer systems and methods disclosed herein are implemented according to some embodiments of the present disclosure.

Higher-order connectivity patterns, or graphlets (i.e., small induced subgraphs, network motifs), are known to be the fundamental building blocks of simple homogeneous networks and are essential for modeling and understanding the fundamental components of these networks. Graphlets are important for many predictive and descriptive modeling application tasks, such as image processing and computer vision, network alignment, classification, visualization and sensemaking, dynamic network analysis, community detection, role discovery, anomaly detection, and link prediction.

However, such "untyped" graphlets are unable to capture the rich connectivity patterns (i.e., "typed" graphlets) in more complex networks such as those that are heterogeneous (e.g., signed graphs, labeled graphs, bipartite graphs, k-partite graphs, attributed graphs, etc.). In heterogeneous graphs, nodes and edges can be of different types and explicitly modeling such types is crucial. Such heterogeneous graphs (e.g., networks) arise ubiquitously in the natural world where nodes and edges of multiple types are observed, e.g., between humans, neurons, routers and autonomous systems (ASes), web pages, devices and sensors, infrastructure (e.g., roads, airports, power stations, etc.), and among vehicles (e.g., cars, satellites, UAVs, etc.).

Compared to homogeneous/untyped graphlets, heterogeneous graphlets/typed graphlets are more powerful containing a significant amount of additional information. Typed graphlets capture both the induced subgraph of interest and the types associated to the nodes in the induced subgraph. These small, induced subgraphs are considered to be the fundamental building blocks of rich heterogeneous networks. Typed graphlets naturally capture the higher-order typed connectivity patterns in bipartite, k-partite, signed, labeled, k-star, attributed graphs, and more generally heterogeneous networks. As such, typed graphlets are useful for a wide variety of predictive and descriptive modeling applications in these rich complex networks.

Despite their fundamental and practical importance, counting typed graphlets in large graphs is a computationally expensive task that severely limits its use in practice. Existing methods for computing typed graphlets are generally limited to extremely small and unrealistic graphs with hundreds or thousands of nodes/edges. Notably, on graphs of even moderate size (e.g., thousands of nodes/edges), existing approaches fail to finish in a reasonable amount of time (e.g., within a 24 hour period). Exact counting though feasible for small graphs that arise in the domain of bioinformatics, such an approach may not be feasible for large graphs arising in the domains of social and information networks. For example, exact counting of a data set with 38,692 vertices and 367,664 edges took 2.8 days to complete. Exact counting of another data set with 77,357 vertices and 516,576 edges failed to finish even after 17 days. A larger graph with millions of edges, the subgraph counts can easily reach into the billions. Any exhaustive enumeration method is forced to touch each occurrence of the subgraph, and cannot truly scale. One may apply massive parallelism to counteract this problem, but the fundamental combinatorial explosion would remain an unavoidable issue.

In many applications, speed is more important than accuracy, and it is sufficient to trade off a small amount of accuracy for a significantly faster method. According to certain techniques disclosed herein, rather than exactly counting typed graphlets in graphs varying in size, computational systems disclosed herein perform certain approximating methods for estimating the number of typed graphlets in their respective graphs. Even in very large graphs with edge counts in the millions, the approximating methods disclosed herein can estimate the number of typed graphlets within a band of guaranteed accuracy while providing a significant increase in computation speed.

The following non-limiting examples are used to introduce certain embodiments. In one example, a computing system including one or more processors is used to accurately estimate the number of typed graphlets by sampling edge structures embedded in the test graph. In another example, a computing system including one or more processors is used to accurately estimate the number of typed graphlets by sampling path structures embedded in the test graph.

The methods and systems disclosed herein can accurately estimate typed graphlet counts in a small fraction of the computing time of existing systems. The obtained unbiased estimates are highly accurate, and have a wide variety of applications in the analysis, mining, and predictive modeling of massive real-world networks. During operation, the computing system obtains a dataset indicating nodes and edges of a graph. The computing system samples a portion of the graph (e.g., edge structure, path structure) and counts a number of graph features (e.g., typed graphlet) in the sampled portion of the graph. The computing system then computes an occurrence frequency of the typed graphlet pattern to derive a total number of typed graphlets associated with the typed graphlet pattern in the graph.

As used herein, the terms graphlet, network motif, and induced subgraph are used interchangeably. The terms typed, colored, labeled, and heterogeneous graphlet (i.e., network motif) are used interchangeably.

As used herein, an "entity" refers to any object or item that has attributes or properties associated with it. In one example, an entity includes a person, such as a user of a service, a member of a social network, a researcher in a citation network, or the like. In another example, an entity includes an object, an event, or an item, such as a user session with a web-based application, a financial transaction, an image, or the like.

As used herein, the term "graph" refers to a structure that models pairwise relations among entities in a dataset. A graph includes a set of nodes (also referred to as vertices or points) and a set of undirected or directed edges (also referred to as arcs or lines) connecting the set of nodes. When the edges are directed, the graph is a directed graph. When the edges are undirected, the graph is an undirected graph. Each node in a graph corresponds to an entity in the dataset represented by the graph, and features of a node correspond to attributes of the corresponding entity. A dataset representable by a graph is referred to as a graph-structured dataset.

As used herein, the term "feature matrix" refers to a matrix that describes a set of types, features, or attributes of a set of entities (e.g., users or other objects) in a graph-structured dataset. Each entity is represented by a node (or a vertex, which is used interchangeably with the term "node" in this disclosure) in a graph. For example, each column of a feature matrix corresponds to a feature, and each row of the feature matrix is an entry that represents one entity, where each element in the row describes a corresponding feature or attribute of the entity, such as an identification or a characteristic of the entity. In one example, a feature includes a user, a user name, a real name, an affinity of a user, a biography of a user, commercial proclivities of a user, and the like. In another example, a feature includes a location, an image, a pointer to a storage location of an image, a webpage, social media content, metadata relating to system activities of a user, a user alias, and the like.

As used herein, the term "adjacency matrix" refers to a square matrix used to represent the structural information of a finite graph. The elements of an adjacency matrix indicate whether each pair of nodes in the graph is adjacent or not. An adjacency matrix stores the number of connections (e.g., edges or triangles) between each pair of nodes in the corresponding matrix element. In one example, an adjacency matrix stores the number of edges directly connecting each respective pair of nodes in the corresponding matrix element, where the adjacency matrix is referred to as a one-hop edge-induced adjacency matrix. In some examples, a connection between two nodes is through patterns that each include the two nodes, rather than only through edges directly connecting the two nodes. For example, any two vertices in a polygon (e.g., pentagon) are "connected" to each other through the polygon. In some embodiments, an adjacency matrix includes a normalized adjacency matrix.

As used herein, the term "neighborhood" refers to a subgraph adjacent to a node in a graph. In some examples, a Kth-order neighborhood of a node refers to the set of nodes that lie within a distance K (i.e., K hops or K steps) from the node.

As used herein, the term "motif" refers to a connected subgraph or pattern with a well-defined structure. A motif includes two or more nodes (e.g., vertices) connected according to a pattern. A motif indicates a particular pattern of interactions between nodes. A motif includes, for example, a 2-dimensional subgraph or pattern, a 3-dimensional shape (e.g., a pyramid), or any multi-dimensional pattern or shape. A motif having two to four nodes includes, for example, an edge, a triangle, a 4-path, a 4-cycle, a tailed triangle, a chordal-cycle, a 4-clique, and the like. As used herein, the term "multi-hop motif" refers to multiple connected motifs of a same type, such as multiple connected triangles.

As used herein, the term "degree of a vertex" refers to the number of connections between the vertex and adjacent vertices through motifs of a particular type, such as edges or triangles. In some embodiments, an adjacency matrix is normalized based on the degrees of the vertices.

As used herein, the term "neural network" refers to one or more computer-implemented, network-based models capable of being trained to achieve a goal. Unless otherwise indicated, references herein to a neural network include one neural network or multiple interrelated neural networks that are trained together. Examples of neural networks include, without limitation, convolutional neural networks (CNNs), recurrent neural networks (RNNs), fully-connected neural networks, dense-connection neural networks, feed-forward neural networks, graph convolutional network, graph attention networks, and other types of neural networks. In some embodiments, a neural network is implemented using special hardware (e.g., GPU, tensor processing units (TPUs), or processing element arrays (PE arrays)), using software code and a general purpose processor, or a combination of special hardware and software code.

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without unnecessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

Figure 1B:
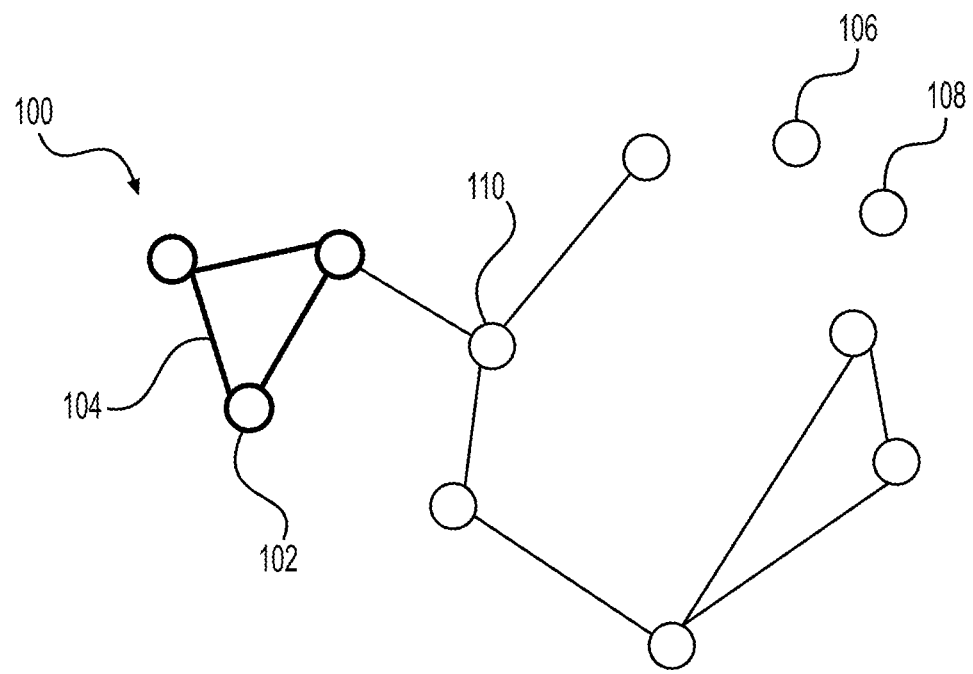
FIG. 1B illustrates an example of a graph including graphlet patterns according to some embodiments.

FIGS. 1A-1G illustrate that the structure of a graph differs significantly when the adjacency is determined based on higher-order structures and/or different types of motifs according to certain embodiments. FIG. 1A illustrates an example of a graph 100 that includes many nodes and edges connecting these nodes. FIG. 1B illustrates an example of a graph including graphlet patterns. As illustrated in FIG. 1B, a graph 100 can include nodes such as 102 and edges such as 104. Because graphs may frequently be analyzed in terms of their topological properties, it is useful to analyze graphs into smaller subgraph patterns defined by the number of nodes and the pattern of edges between them.

As shown in FIG. 1B, a graph can include smaller vertex-induced subgraphs, also called graphlets. For example, node 102 takes part in a fully-connected graphlet, or clique, of size k=3 vertices, shown in dark lines. Note that a clique of size k=3 is also called a triangle. Nodes 106 and 108 have no connections, and therefore form a graphlet of size k=2 called the 2-node-independent graphlet. Node 110 is the center of a graphlet of size k=4 called a 3-star.

Figure 1C:
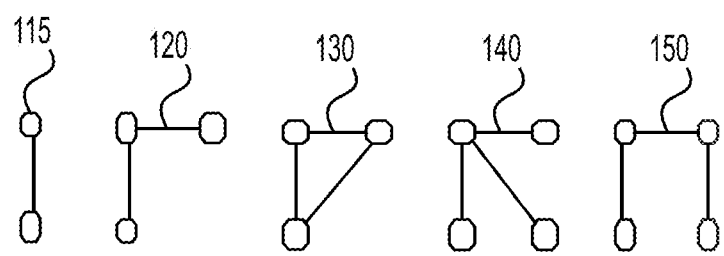
FIG. 1C illustrates various types of motifs including 2 to 4 nodes according to some embodiments.
Figure 1C:
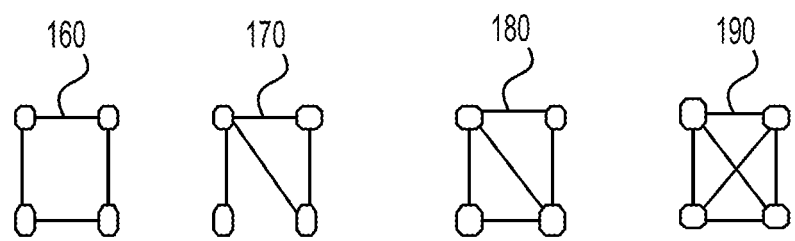

FIG. 1C illustrates various types of motifs including 2 to 4 nodes according to certain embodiments. The motifs include, for example, an edge motif 115, a two-edge-star (also referred to as 2-star) motif 120, a triangle motif 130, a three-edge-star (also referred to as 3-star) motif 140, a four-node-path (also referred to as 4-path) motif 150, a four-node-cycle (also referred to as 4-cycle) motif 160, a tailed triangle motif 170, a four-node-chordal (also referred to as 4-chordal) motif 180, a four-node-clique (also referred to as 4-clique) motif 190, etc. Other motifs including more than four nodes are used in some embodiments. As described above, in some embodiments, a motif includes a 2-dimensional subgraph or pattern, a 3-dimensional shape (e.g., a prism or pyramid), or any multi-dimensional pattern or shape.

Figure 1D:
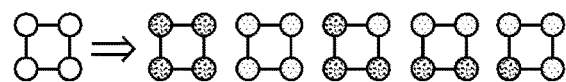
FIG. 1D illustrates an example of typed 4-cycles with 2 types according to some embodiments.
Figure 1E:
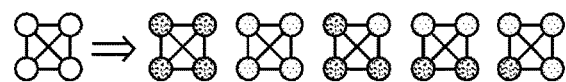
FIG. 1E illustrates an example of typed 4-cliques with 2 types according to some embodiments.
Figure 1F:
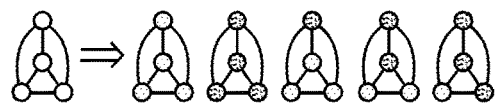
FIG. 1F illustrates another example of typed 4-cliques with 2 types according to some embodiments.
Figure 1G:
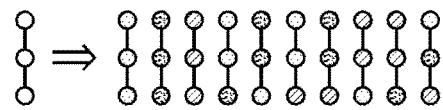
FIG. 1G illustrates an example of typed 3-paths with 3 types according to some embodiments.

FIGS. 1D-1G illustrate examples of typed graphlets according to certain embodiments. FIG. 1D illustrates examples of typed 4-cycles with two types. FIG. 1E illustrates examples of typed 4-cliques with two types. FIG. 1F illustrates other examples of typed 4-cliques with two types. FIG. 1G illustrates examples of typed 3-paths with three types.

Figure 2:
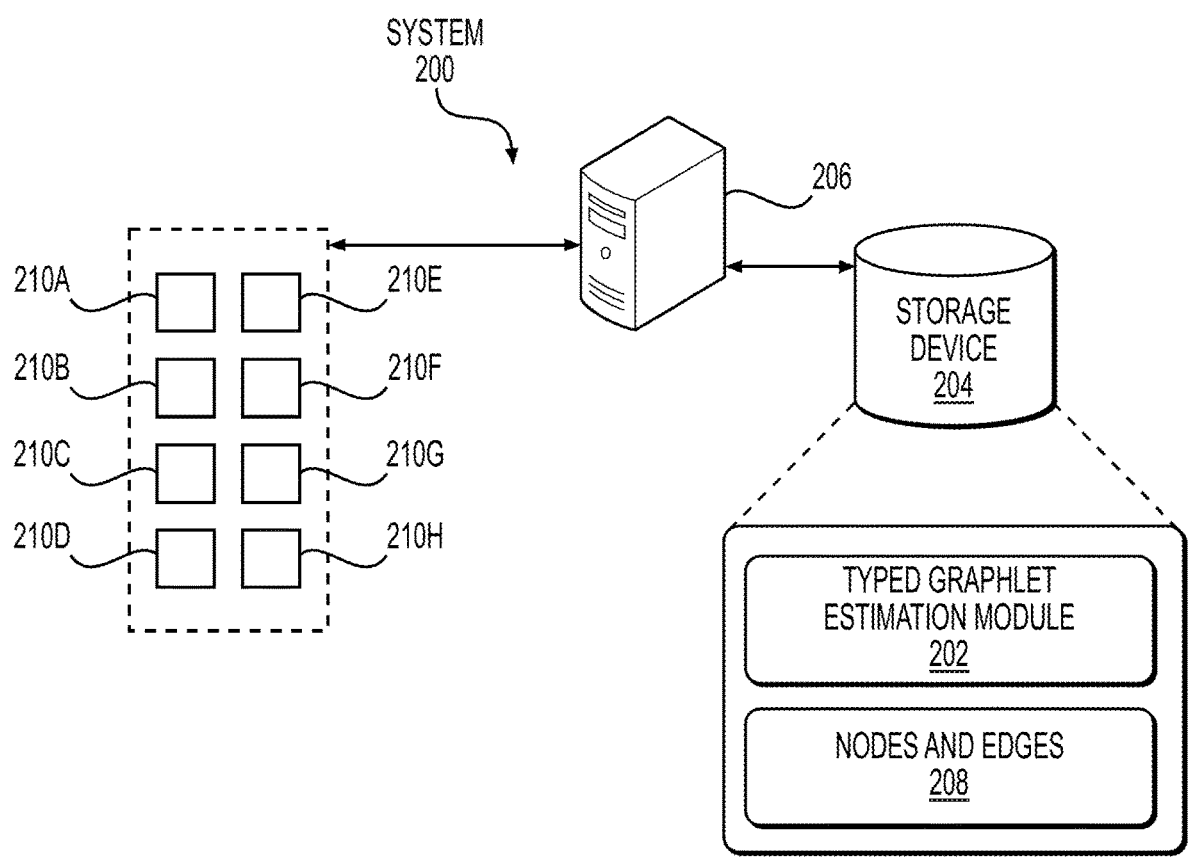
FIG. 2 illustrates an exemplary architecture of a graph computation system utilizing the typed graphlet estimation method, according to some embodiments.

FIG. 2 presents a block diagram illustrating an exemplary architecture of a system 200 utilizing the typed graphlet estimation method, according to certain embodiments. System 200 may divide the nodes of a graph and estimate typed graphlet statistics in a graph, according to certain embodiments, in parallel with multiple processors (e.g., cores, core processors). In standard computing systems, system 200 would require very significant computational cost and space to count the number of typed graphlets in larger graphs. However, using the methods disclosed herein, system 200 enables the user to accurately and scalably estimate the number of typed graphlets in graphs of various sizes, including very large and massive graphs, in far less time and storage space.

System 200 may include a typed graphlet estimation module 202 installed on a storage device 204 coupled to a server 206. Note that various embodiments of the typed graphlet computation system may include any number of servers and storage devices. In some embodiments, typed graphlet estimation module 202 may include a graph-sampling module or other components of system 200 to perform the techniques described herein. System 200 may receive a dataset describing nodes and edges 208, and may store the dataset in storage device 204. System 200 may read the code for the typed graphlet estimation module 202 and the dataset for nodes and edges 208 from storage device 204. System 200 may divide graph neighborhoods or portions of graphs, and assign them to processors, such as processors 210A-210H, which operate on the assigned neighborhoods or portions.

The following are non-limiting examples used to introduce certain embodiments. In one example, computing systems disclosed herein perform an approximation method for estimating the number of typed graphlets in a graph based on edge sampling. In another example, computing systems disclosed herein perform an approximation method for estimating the number of typed graphlets in a graph based on path sampling.

Following are preliminaries for an estimation framework, whether sampling edge structures or typed path structures in a graph. Given a graph G with L types, the global typed graphlet counting problem is to find the set of all typed graphlets that occur in graph G along with their corresponding frequencies. The number of occurrences of the i-th typed induced subgraph is denoted as $C_{i,t}$ with types t. For example, $C_{4,t}$ is the number of induced 4-cycles of type t in graph G, which is the number of distinct subsets of 4 nodes that induce a 4-cycle. An induced subgraph takes into consideration a subset of nodes and all edges among the subset of nodes; whereas a non-induced subgraph simply considers some subset of edges. Further, $N_{i,t}$ denotes the count of the i-th typed non-induced subgraph with types t. There is a simple linear relationship between induced and non-induced typed subgraph counts, as shown in Eq. 1:

$$\underbrace{\begin{pmatrix} 1 & 0 & 1 & 0 & 2 & 4 \\ 0 & 1 & 2 & 4 & 6 & 12 \\ 0 & 0 & 1 & 0 & 4 & 12 \\ 0 & 0 & 0 & 1 & 2 & 3 \\ 0 & 0 & 0 & 0 & 1 & 6 \\ 0 & 0 & 0 & 0 & 0 & 1 \end{pmatrix}}_{A} \begin{pmatrix} C_{1,t} \\ C_{2,t} \\ C_{3,t} \\ C_{4,t} \\ C_{5,t} \\ C_{6,t} \end{pmatrix} = \begin{pmatrix} N_{1,t} \\ N_{2,t} \\ N_{3,t} \\ N_{4,t} \\ N_{5,t} \\ N_{6,t} \end{pmatrix}, \quad (1)$$

where $A_{i,j}$ is the number of distinct copies of the i-th typed subgraph in the j-th subgraph. For example, $A_{2,4}=4$, the number of 3-paths in the 4-cycle.

Typed Edge Sampling and Estimation

The following non-limiting example is used to introduce certain embodiments. In this example, computing systems disclosed herein approximates the number of typed graphlets based on sampling edge structures in a graph. In some embodiments, $J \subseteq E$ may be a subset of edges sampled via a uniform or weighted distribution $\mathbb{F}$. Further, $X_H = [x_1 x_2 \ldots] \in \mathbb{R}^{|J| \times |\mathcal{H}|}$ denotes the typed graphlet counts that occur at each sampled edge in J for a specific induced subgraph H (e.g., 4-clique, 4-cycle), and $\mathcal{H}$ is the set of typed graphlets of H. Given $X_H$, unbiased estimates for the typed graphlet counts are derived as:

$$\hat{X}_H = \left(\frac{|J|}{|E|}\right)^{-1} \frac{e^T X_H}{|E(H)|} \quad (2)$$

where $|E(H)|$ is the number of edges in the graphlet H and $e \in \mathbb{R}^{|J|}$ is a vector of 1's. This method samples an edge via $\mathbb{F}$ and all the neighbors of that edge. The computing system may count all of the typed graphlets that occur between the neighbors of that sampled edge. From these counts, the computing system may compute unbiased estimates of the overall global counts of all typed graphlets in graph G.

Typed Path Sampling

In this example, a computing system disclosed herein samples a set of nodes representing non-induced typed paths in graph G. In doing so, a computing system considers the following preliminaries: $\Gamma_i^t$ denotes a set of nodes adjacent to i of type t and $d_i^t = |\Gamma_i^t|$. Given an edge $(i,j) \in E$ with types $\phi_i$ and $\phi_j$, the (i, j)-entry of the typed wedge matrix with types t and t' is defined in Eq. 3 as:

$$\Lambda_e^{tt'} = \Lambda_{ij}^{tt'} = \begin{cases} (d_i^t - 1)(d_j^{t'} - 1) & \text{if } t = \phi_j \wedge t' = \phi_i \\ (d_i^t - 1)d_j^{t'} & \text{if } t = \phi_j \wedge t' \neq \phi_i \\ d_i^t(d_j^{t'} - 1) & \text{if } t \neq \phi_j \wedge t' = \phi_i \\ d_i^t d_j^{t'} & \text{otherwise} \end{cases} \quad (3)$$

Note that $(d_i^t - 1)$ excludes the neighbor j if $\phi_j = t$ (e.g., same type). The computing system further considers if wedges $W = \Sigma_{(i,j) \in E}(d_i - 1)(d_j - 1)$ and $W^{t\,t'} = \Sigma_{(i,j) \in E} \Lambda_{ij}^{tt'}$, then $W = > \Sigma_t \Sigma_{t'} W^{t\,t'}$, which implies the total number of wedges W in graph G is equal to the sum of typed wedges $W^{t\,t'}$ for all t, t'$\in \{1, \ldots, L\}$.

Based on these preliminaries, a computing system may sample typed paths in graph G by iterating through a series of steps defined below as Alg. 1, which starts by calculating $\Lambda_e^{t\,t'}$ (Eq. 3) for all typed edges and by setting probability $p_e^{t\,t'}$ to equal $\Lambda_e^{t\,t'}/W^{t\,t'}$. After these initial steps, the computing system samples typed paths by performing the following steps of Alg. 1:

i) select e=(i,j) of the type $t_e$=(t, t') with probability $p_e^{t\,t'}$;

ii) select i'$\in \Gamma_i^{t1}$ with type $t_1$ uniformly at random such that i'$\neq$j if $\phi_1 = t_1$; and iii) select j'$\in \Gamma_j^{t2}$ with type $t_2$ uniformly at random such that j'$\neq$i if $\phi_i = t_2$.

Following the steps in Alg. 1 will result in a set of four sampled nodes (i', i, j, j') with types ($t_1$, t, t', $t_2$) that form a typed 4-path with edges {(i', i), (i, j), (j, j')}.

The output of Alg. 1 reflects that for any typed 4-path with types (t, $t_i$, $t_j$, t'), the probability that a computing system outputs a typed 4-path is exactly $1/W^{t\,t'}$. The probability is the same for all typed 4-paths as proven in the following four cases of Eq. 3:

i) if t is the type of node j ($t=\phi_j$) and t' is the type of node i ($t'=\phi_i$), then the typed 4-path is selected with probability:

$$\frac{(d_i^t - 1)(d_j^{t'} - 1)}{W{tt'}} \cdot \frac{1}{(d_i^t - 1)} \cdot \frac{1}{(d_j^{t'} - 1)} = \frac{1}{W{tt'}};$$

ii) if t is the type of node j ($t=\phi_j$), but t' is not the type of node i ($t'=\phi_i$), then the typed 4-path is selected with probability:

$$\frac{(d_i^t - 1)d_j^{t'}}{W{tt'}} \cdot \frac{1}{(d_i^t - 1)} \cdot \frac{1}{d_j^{t'}} = \frac{1}{W{tt'}};$$

iii) if t is not the type of node j ($t \neq \phi_j$) and t' is the type of node i ($t'=\phi_i$), then the typed 4-path is selected with probability:

$$\frac{d_i^t(d_j^{t'} - 1)}{W{tt'}} \cdot \frac{1}{d_i^t} \cdot \frac{1}{(d_j^{t'} - 1)} = \frac{1}{W{tt'}};$$

and iv) if t is not the type of node j ($t \neq \phi_j$) and t' is not the type of node i ($t' \neq \phi_i$), then the typed 4-path is selected with probability:

$$\frac{d_i^t d_j^{t'}}{W{tt'}} \cdot \frac{1}{d_i^t} \cdot \frac{1}{(d_j^{t'})} = \frac{1}{W{tt'}}.$$

Estimation Via Typed Paths

In this example, computing systems disclosed herein may approximate the number of typed graphlets in a graph based on sampling typed paths. In some embodiments, a computing system may first determine the typed graphlets induced from the set of four sampled nodes (i', i, j, j'). The computing system may then repeat the sampling of typed paths k times before applying Eq. 1 to estimate the actual global counts of the typed graphlets $C_{i,\,t}$. The series of steps for estimating the actual global counts of typed graphlets based on typed path sampling is shown below in Alg. 2.

Algorithm 2: Estimation via Typed Paths
Input: graph G, # samples k
Output: estimated counts for all typed 4-node graphlets
1 Obtain k samples (sets of nodes) by running Alg.1 k times where $S_j$ (denotes the j-th set of nodes.
2 parallel for j = 1, ... , k do
3    Determine subgraph induced by $S_j$ (and type vector t)
4    If this is the i-th graphlet with types t, increment $F_{i,t}^{t\,t'}$
5    Increment $k^{t\,t'}$ where t, t' are the other two node types
6 for i $\in$ [2, 6] and type vector t do
7    for all t, t' $\in$ {1, ... , L} do Set $\hat{C}_{i,t} = \hat{C}_{i,t} + (F_{i,t}^{t\,t'}/k^{t\,t'}) \cdot W^{t\,t'}/A_{2,\,i}$
8    Set $\hat{C}_{i,t} = \hat{C}_{i,t}/2$
9 Set $\hat{C}_{1,t} = N_{1,\,t} - \hat{C}_{3,t} - 2\hat{C}_{5,t} - 4\hat{C}_{6,t}$, $\forall$t such that $N_{1,\,t}$ is computer via Eq. 4.

$N_{1,\,t}$ is first derived to obtain the estimated count $\hat{C}_{1,t}$ of typed 4-stars with type vector t. $N_{1,\,t}$ is derived per Eq. 4 as follows:

$$N_{1,t} = \sum_{i \in V^t} d_i^{t1} \cdot (d_i^{t2} - 1) \cdot \frac{(d_i^{t3} - 2)}{6} \quad (4)$$

where t=[$t_1$ $t_2$ $t_3$ t]. Of note, Eq. 4 is for when types are the same. For brevity's sake, the other cases are omitted as they are just as straightforward. The computing system may then derive the estimated count of typed 4-node star graphlets in o(1) time via $\hat{C}_{1,t} = N_{1,\,t} - \hat{C}_{3,t} - 2\hat{C}_{5,t} - 4\hat{C}_{6,t}$.

Figure 3:
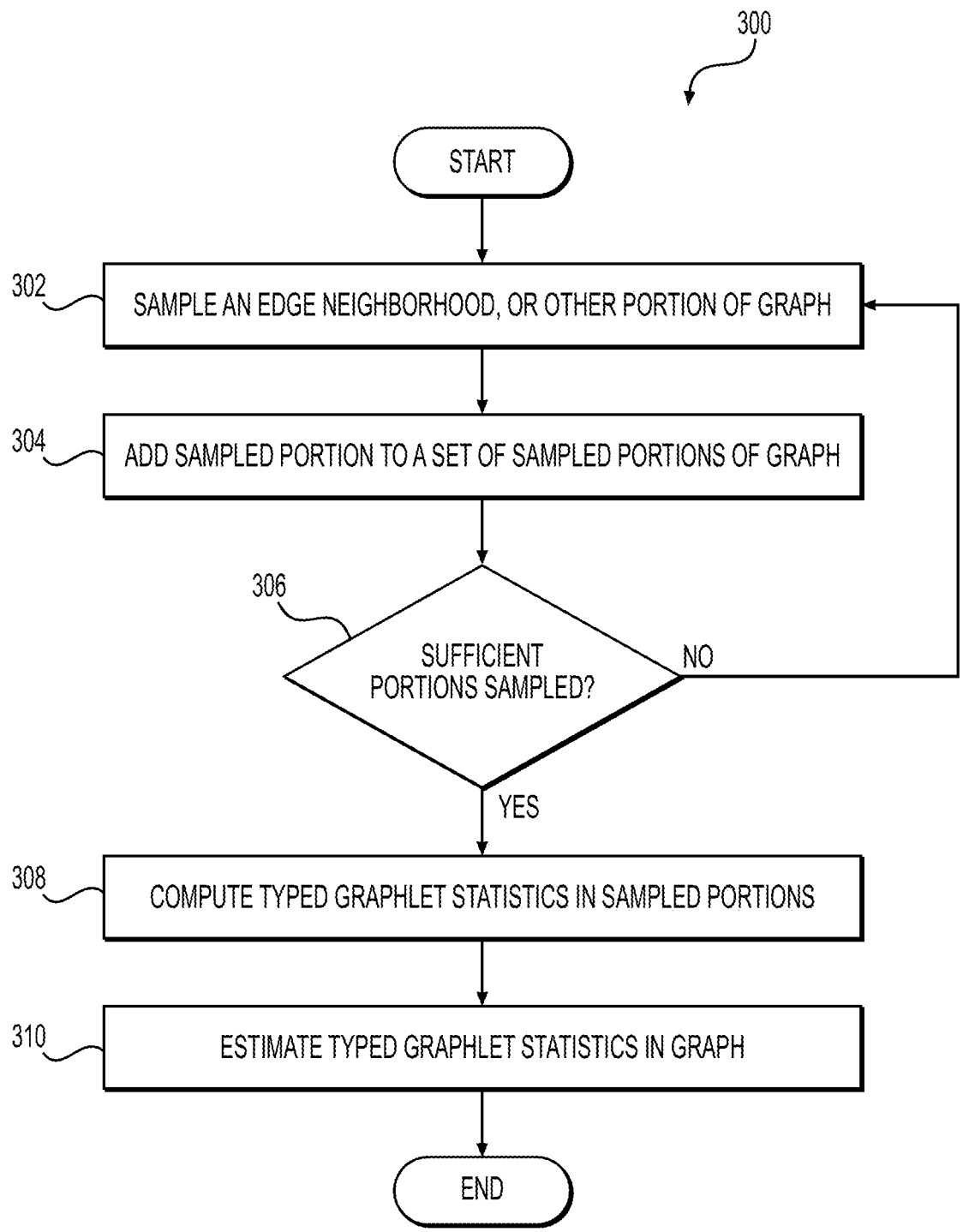
FIG. 3 illustrates an exemplary method for estimating typed graphlet statistics based on sampling portions of a graph, according to some embodiments.

FIG. 3 presents a flowchart 300 illustrating an exemplary method for estimating typed graphlet statistics based on sampling portions of a graph, according to certain embodiments. In operation, the computing system samples a portion of graph G (operation 302). In some embodiments, the portion of graph G may include an edge neighborhood. In some embodiments, the system samples portions of a graph via uniform discrete sampling, according to a sampling probability. For example, the system may sample edge neighborhoods by uniformly sampling edges from the set of all edges in the graph, according to a probability p which may be user-specified. In other embodiments, the computing system may use weighted sampling or an arbitrary sampling probability distribution $p_i$. In other embodiments, the system may adjust a sampling criteria adaptively in order to satisfy a desired error bound, as described later in this disclosure.

The computing system may then add the sampled portion of graph G to a set of sampled portions of the graph (operation 304) (e.g., repeating the sampling of typed paths k times). The system may then determine whether sufficient portions have been sampled (operation 306). This determination may proceed, for example, by sampling every edge neighborhood or other portions of graph G (e.g., typed paths) according to a sampling probability. In some embodiments, determination 306 may proceed by sampling until a predetermined number of edge neighborhoods or other portions of graph G (e.g., typed paths) have been sampled. In other embodiments, determination 306 may proceed according to an adaptive estimation method, such as method 500 described below. Responsive to determining that insufficient portions have been sampled, the system may then repeat the process starting from sampling operation 302.

Responsive to determining that sufficient portions have been sampled in graph G, the computing system may calculate the number of typed graphlets in the sampled portions (operation 308). The system may then estimate the actual global counts of typed graphlets in graph G (operation 310).

Figure 4:
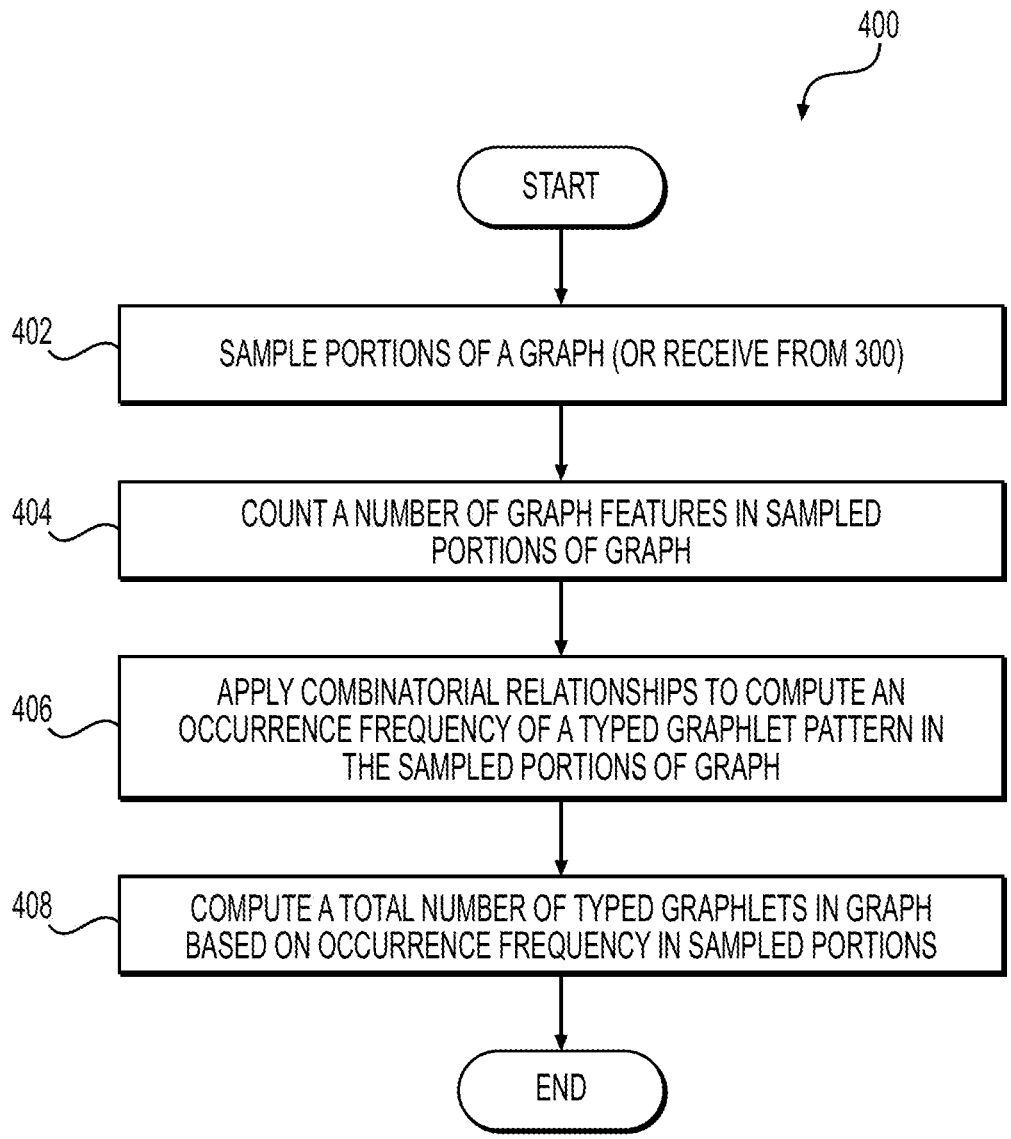
FIG. 4 illustrates an exemplary method for estimating a number of typed graphlets given sampled portions of a graph, according to some embodiments.

FIG. 4 presents a flowchart 400 illustrating an exemplary method for estimating a number of typed graphlets given sampled portions of a graph, according to certain embodiments. In operation, the computing system may sample an edge neighborhood or other portion of graph G (operation 402). Alternatively, in step 402, the computing system may receive the sampled portions of graph G as described in method 300. The computing system may then count a number of graph features in the sampled portions of graph G (operation 404). In some embodiments, the counted graph features may be derived from various graph features, such as e.g., typed edges, typed wedges, typed paths, 2-stars, etc. In other embodiments, the counted graph features may include typed 4-cliques and typed 4-cycles.

However, it is to be appreciated that the approximation methods disclosed herein may be generalized to estimate typed graphlets of an arbitrary size k, including k>4. Specifically, the computing system may directly compute the k-graphlets by leveraging k−1 typed graphlet patterns (lower order subgraph counts). From this small set, k-cliques and/or k-cycles may be computed and combinatorial relationships may be used to compute other k-graphlet counts directly in constant time. This method is significantly faster (by an order of magnitude) than prior approaches and counts all typed graphlets of size k by directly enumerating only typed graphlets of size k−1. This method systematically builds a system of equations for deriving linear relationships between the counts of various typed graphlet patterns. The counts of the k-graphlets may be computed directly through a system of equations representing the dependencies between various k-graphlets using counts for the k−1 graphlets. Notably, every k-vertex graphlet can be constructed by adding a vertex to a k−1 graphlet.

After counting a number of graph features, the system may apply combinatorial relationships to compute an occurrence frequency of a typed graphlet pattern from the sampled portions of graph G (operation 406). The system may then compute a total number of typed graphlets associated with the typed graphlet pattern based on the sampled portions of graph G (operation 408).

Figure 5:
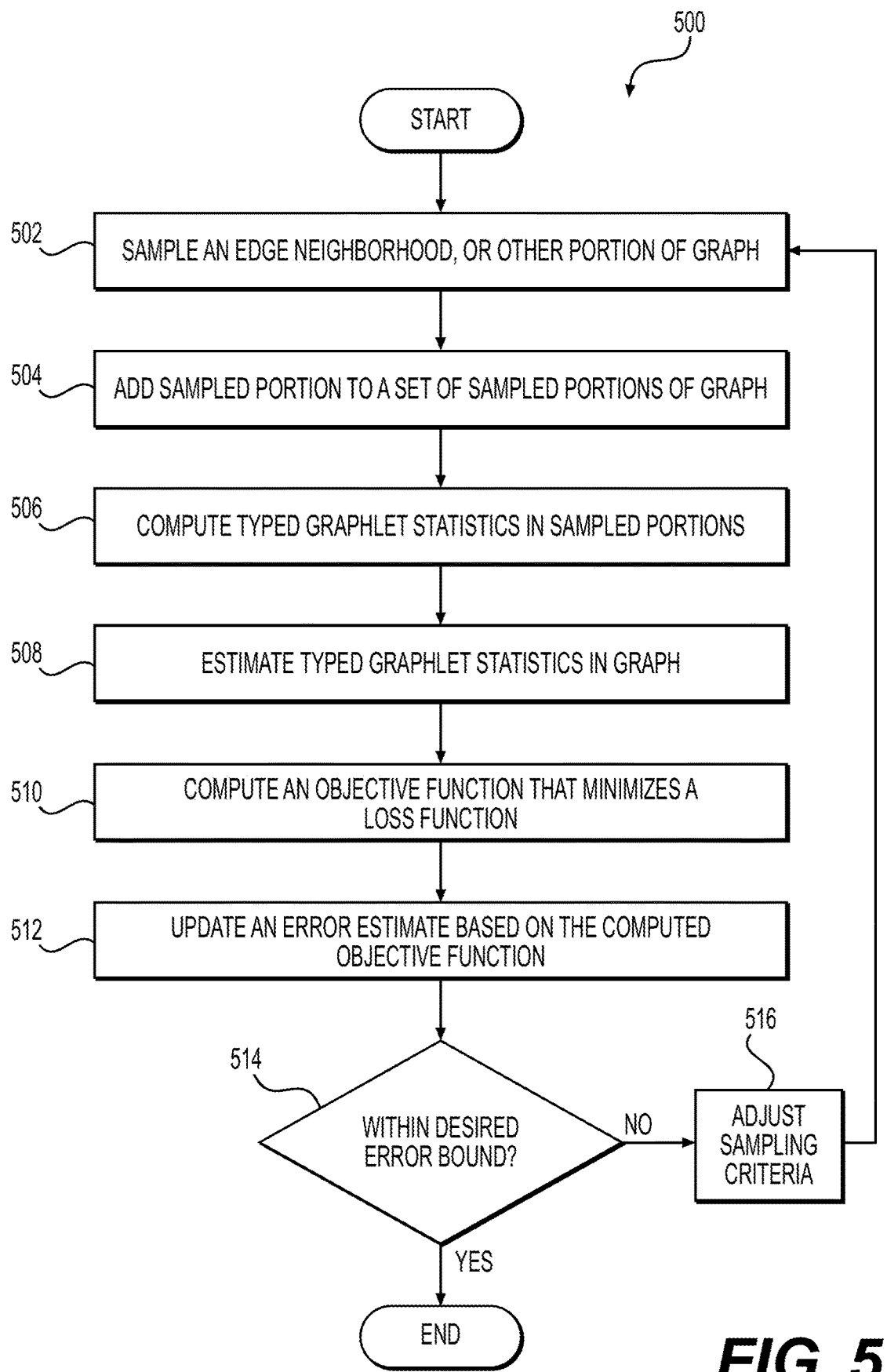
FIG. 5 illustrates an exemplary method for adaptive estimation of typed graphlets within a predefined error bound, according to some embodiments.

FIG. 5 presents a flowchart 500 illustrating an exemplary method for estimating graphlet statistics adaptively within a pre-specified error bound, according to certain embodiments. Note that method 500 may be understood to include additional detail for operation 306 (e.g., in deciding whether sufficient portions have been sampled from graph G). In some embodiments, method 500 may include a variance in the number of samples k between successive estimations to iteratively determine whether the successive estimations are sufficiently within a predefined error bound.

In this example, the computing system may sample edge neighborhoods or other portion of graph G (e.g., typed paths) (operation 502). The computing system may then add the sampled portion to a set of sampled portions of graph G (operation 504). The computing system may then compute typed graphlet statistics from the sampled portions of graph G (operation 506) to derive estimates of actual global counts of the typed graphlets (operation 508). The computing system may then compute an objective function to minimize an arbitrary loss function (operation 510). The estimation framework provides provable guarantees on the error. In some embodiments, the loss function may be a relative graphlet estimation error maximized over all graphlet patterns up to size k=4, or over all considered graphlet patterns.

Given an application-specific error tolerance (or a user-specified accuracy guarantee), the computing system can then derive estimates of the typed graphlets that are within those bounds. With renewed reference to FIG. 5, the computing system may then update an error estimate based on the computed objective function (operation 512) (e.g., application-specific error tolerance, or a user-specified accuracy guarantee). The computing system may then determine whether the error estimate is within the desired error bound (operation 514). In response to determining that an error estimate is not within a specified error bound, the computing system may then adjust the sampling criteria (operation 516) and return to operation 502 (e.g., sampling additional portions of graph G). In response to determining that the error estimate is within the specified error bound, the computing system may then output the estimated global count of the typed graphlets.

Figure 6A:
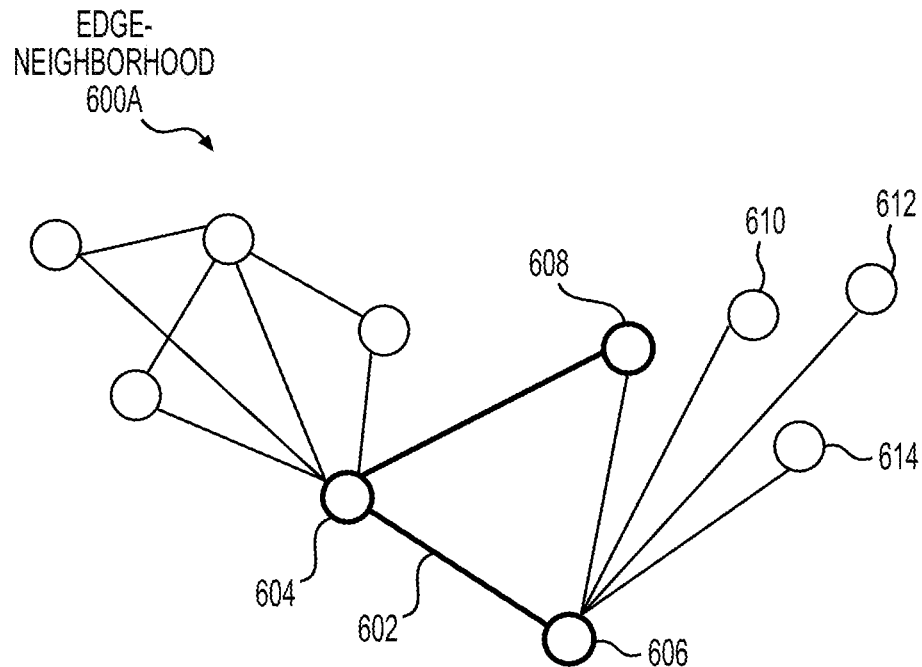
FIG. 6A illustrates an exemplary edge neighborhood, including a triangle graphlet pattern, according to some embodiments.

As discussed above, an edge neighborhood (e.g., an edge-induced neighborhood) is defined as an edge e, the two nodes i and j connected by the edge, and the subgraph induced by these two nodes. That is, the edge neighborhood includes all neighbors of the two nodes i and j and all edges connecting them. In certain embodiments, the computing system samples graph G by sampling typed edges and their associated edge neighborhoods. FIG. 6A illustrates an exemplary edge neighborhood 600A based on edge 602 connecting nodes 604 and 606. Exemplary edge neighborhood 600A is the subgraph induced by nodes 604 and 606. In other words, neighborhood 600A includes all neighbors of nodes 604 and 606 and all the edges connecting them.

As previously discussed, a sampled edge neighborhood may contain a number of typed graphlets. In some embodiments, the computing system may count triangles and 2-stars that are located in a sampled edge neighborhood, and which contain both nodes i and j defining that edge. For example, edge neighborhood 600A is defined by nodes 604 and 606. As shown in dark lines in FIG. 6A, neighborhood 600A includes node 608, which is connected to both nodes 604 and 606, and which completes a triangle with these nodes. Likewise, nodes 610, 612, and 614 all complete 2-stars with nodes 604 and 606, as shown. In certain embodiments, the computing system may count all typed graphlets belonging to neighborhood 600A. In other embodiments, the computing system may count triangles by identifying nodes, such as node 608, connected to nodes i and j which define the edge neighborhood. In other embodiments, the computing system may store a set of such nodes in memory or non-transitory storage. In other embodiments, the computing system may count 2-stars by identifying nodes, such as node 610, connected to one node i or j defining the edge neighborhood, but not the other. In other embodiments, the computing system may store sets of such nodes in memory or non-transitory storage.

Figure 6B:
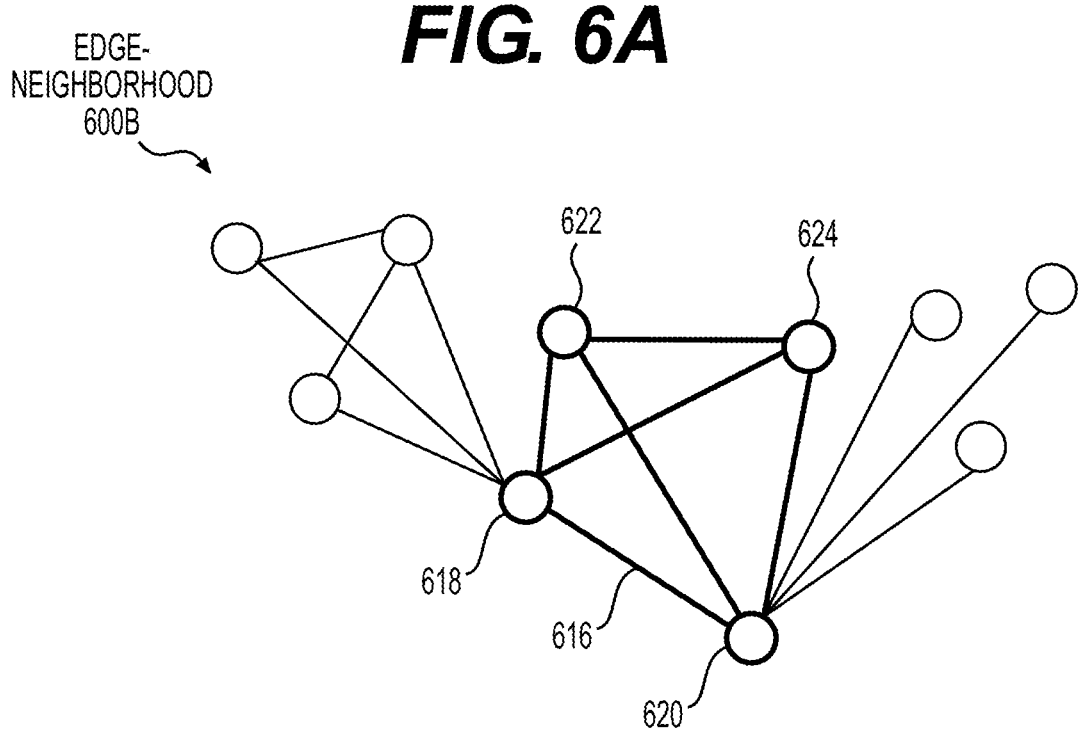
FIG. 6B illustrates an exemplary edge neighborhood, including a 4-clique graphlet pattern, according to some embodiments.

In some embodiments, the computing system may also count 4-cliques and 4-cycles in the edge neighborhood that contain both nodes defining the edge. FIG. 6B illustrates an exemplary edge neighborhood 600B defined by edge 616 connecting nodes 618 and 620. As shown in dark lines, nodes 622 and 624 complete a 4-clique graphlet with nodes 618 and 620. In other embodiments, the computing system may count all such 4-clique graphlets as well as 4-cycle graphlets belonging to a sampled edge neighborhood.

It is to be appreciated that the computing system may make use of previously-counted graphlet patterns, such as, e.g., triangles and 2-stars, in order to expedite the counting of other graphlet patterns, such as, e.g., 4-cliques and 4-cycles. In other embodiments, the computing system may be leveraged in a streaming fashion (e.g., for real-time settings) for both edge neighborhood sampling and typed path sampling. Moreover, both approaches lend themselves to an efficient parallel implementation. For example, the sampling of an edge and its neighbors can be performed in parallel, as each sample is independent of each other. Similarly, the sampling of typed paths can be performed independently in parallel. Also, the estimation steps for both edge sampling and typed path sampling can be performed independently in parallel.

In comparing the typed path sampling (TPS) to the simpler typed edge sampling (TES) method, the typed path sampling (TPS) method significantly outperforms the typed edge sampling (TES) method across the different typed graphlets. With reference to FIG. 7A, Table 1 lists the mean relative error of the estimated counts for five typed graphlets. The mean relative error in Table 1 is defined as:

$$\frac{1}{|\mathcal{H}|}\sum_{H\in\mathcal{H}}\frac{|\hat{C}_H - C_H|}{C_H} \quad (5)$$

where $\mathcal{H}$ is the set of typed graphlets for an induced subgraph (e.g., 4-clique), $C_H$ is the exact count of H, and $\hat{C}_H$ is the estimated count. The results in Table 1 show that the typed path sampling (TPS) method significantly outperforms typed edge sampling (TES) in estimating typed graphlets for each of the respective datasets (e.g., fb-political, yahoo-msg, web-polblogs, soc-wiki-elec, and soc-digg). In determining the mean relative error for Table 1, k was set to 50,0000 and the estimation of the typed graphlets was performed 100 times.

With reference to FIG. 7B, Table 2 lists typed graphlet estimates and relative error using k=50,000 for typed 4-cliques. The standard deviation/variance of the typed path sampling (TPS) method is shown to be about an order of magnitude smaller than the typed edge sampling (TES) method. The dataset fb-political was used for estimating the typed graphlets and deriving the relative error shown in Table 2.

Figure 7C:
FIG. 7C lists mean relative error values of typed graphlet estimates obtained by systems and methods disclosed herein, based on experimental results.
Figure 7C:
Figure 7C:
Figure 7C:
Figure 7C:

With reference to FIG. 7C, Table 3 lists the mean relative error of the respective typed graphlets estimates. The results shown in Table 3 are from large-scale visitor stitching web log datasets (e.g., Adobe Web Logs, MS Web Logs). It is to be appreciated that the typed edge sampling (TES) method and the typed path sampling (TPS) method will be very useful since typed graphlets have been shown to be extremely useful for identity stitching in device graph data as well as household/organization clustering. For the mean relative error of typed graphlet estimates in Table 3, k was set to 500,000 and the estimations were performed 100 times.

In the tables to follow, the runtime results (e.g., in seconds) are listed when estimating typed graphlets for both Adobe and MS Web Log datasets. The runtime results are shown for the estimation methods (e.g., Alg. 1 and 2) compared to the fastest exact counting algorithms.

| Data (Visitor Stitching) | Runtime (sec.) k = 50,000 | | |
|---|---|---|---|
| | Estimation Method (Alg. 1-2) | Fastest Exact Alg. | Speedup |
| Adobe Web Logs | 0.052 | 465.31 | 8,848x |
| MS Web Logs | 0.098 | 2625.72 | 26,793x |

| Data (Visitor Stitching) | Runtime (sec.) k = 500,000 | | |
|---|---|---|---|
| | Estimation Method (Alg. 1-2) | Fastest Exact Alg. | Speedup |
| Adobe Web Logs | 0.0803 | 465.31 | 5,794x |
| MS Web Logs | 0.1208 | 2625.72 | 21,736x |

The runtime results listed in these tables show more than a thousand times speedup in both cases, taking only a fraction of a second for both sample sizes. As mentioned above, the disclosed methods may parallelize extremely well because the sampled portions may be sampled and processed independently by separate core processors. For the listed runtime results, both the estimation and exact algorithms were parallelized using eight core processors.

Figure 7D:
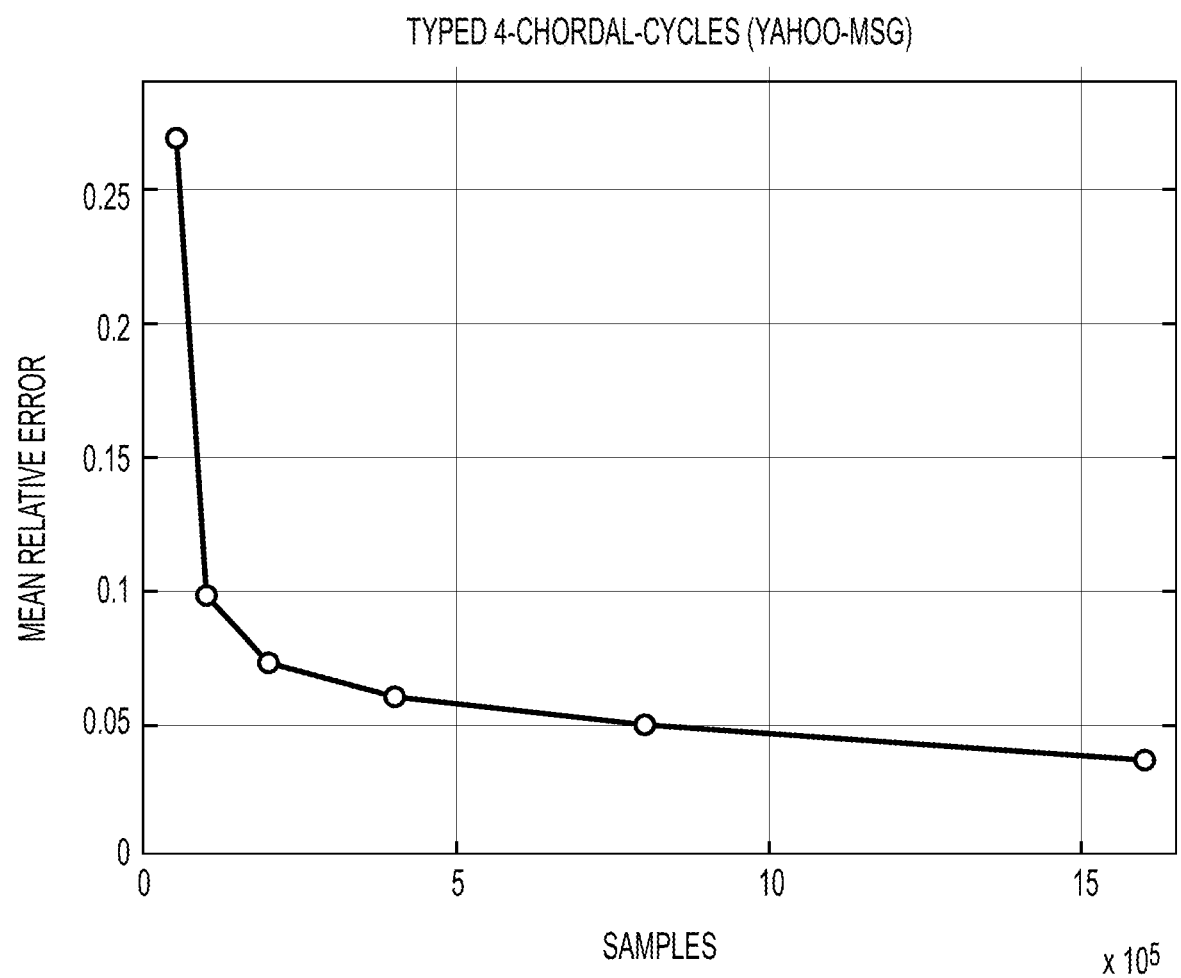
FIG. 7D illustrates convergence of typed graphlet estimates in which mean relative error values decrease towards zero as the sample size increases, based on experimental results.

With reference to FIG. 7D, a graph shows a convergence of estimated counts of typed 4-chordal-cycles in yahoo-msg dataset. The number of samples k were varied to include k={50K, 100K, 200K, 400K, 800K, 1.6M} and resulted in the mean relative error decreasing towards zero as the sample size increased. Notably, the number of typed 4-chordal-cycles in yahoo-msg dataset were estimated in less than a second both by typed edge sampling (TES) and by typed path sampling (TPS).

Figure 8:
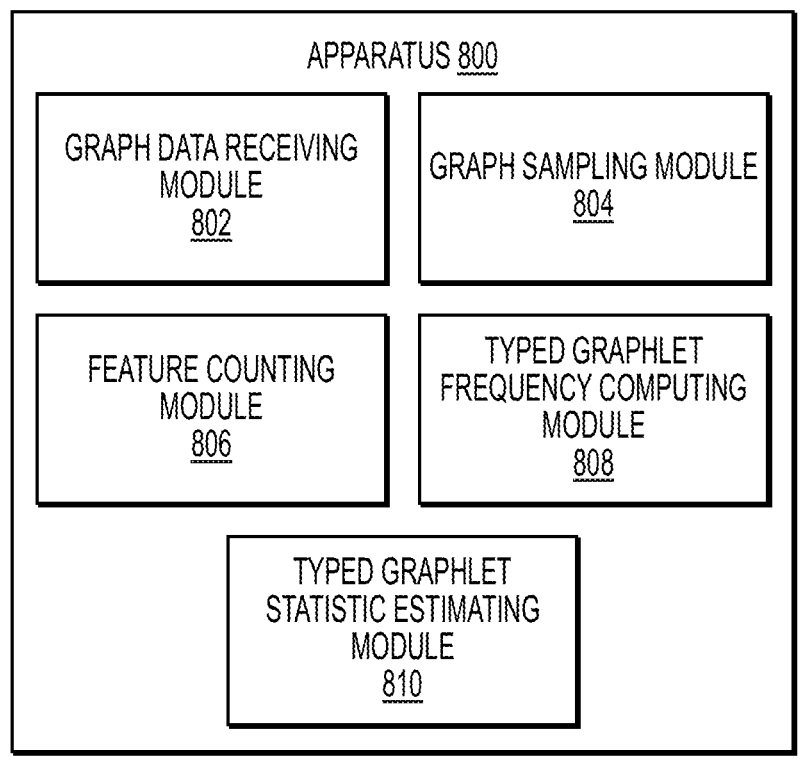
FIG. 8 illustrates an exemplary apparatus for typed graphlet estimation, according to some embodiments.

FIG. 8 presents a block diagram illustrating an exemplary apparatus 800 that facilitates typed graphlet estimation, in accordance with some embodiments. Apparatus 800 can comprise a plurality of modules which may communicate with one another via a wired or wireless communication channel. Apparatus 800 may be realized using one or more integrated circuits, and may include fewer or more modules than those shown in FIG. 8. Further, apparatus 800 may be integrated in a computer system, or realized as a separate device which is capable of communicating with other computer systems and/or devices. Specifically, apparatus 800 can comprise a graph data-receiving module 802, a graph-sampling module 804, a feature-counting module 806, a typed graphlet frequency-computing module 808, and a typed graphlet statistic-estimating module 810. Note that apparatus 800 may also include additional modules not depicted in FIG. 8.

In some embodiments, graph data-receiving module 802 may receive data comprising a representation of vertices and edges of a graph. Graph-sampling module 804 may sample edge neighborhoods or other portions of the graph. Feature-counting module 806 may obtain an exact count of graph features in the sampled portions of the graph, for example, k-graphlets such as triangles, 2-stars, 4-cliques, or 4-cycles. Typed graphlet frequency-computing module 808 may compute, based on applying combinatorial relationships to the counted graph features, the occurrence frequency of typed graphlet patterns in the sampled portions of the graph. Typed graphlet statistic-estimating module 810 may compute a total number of typed graphlets in the graph.

Figure 9:
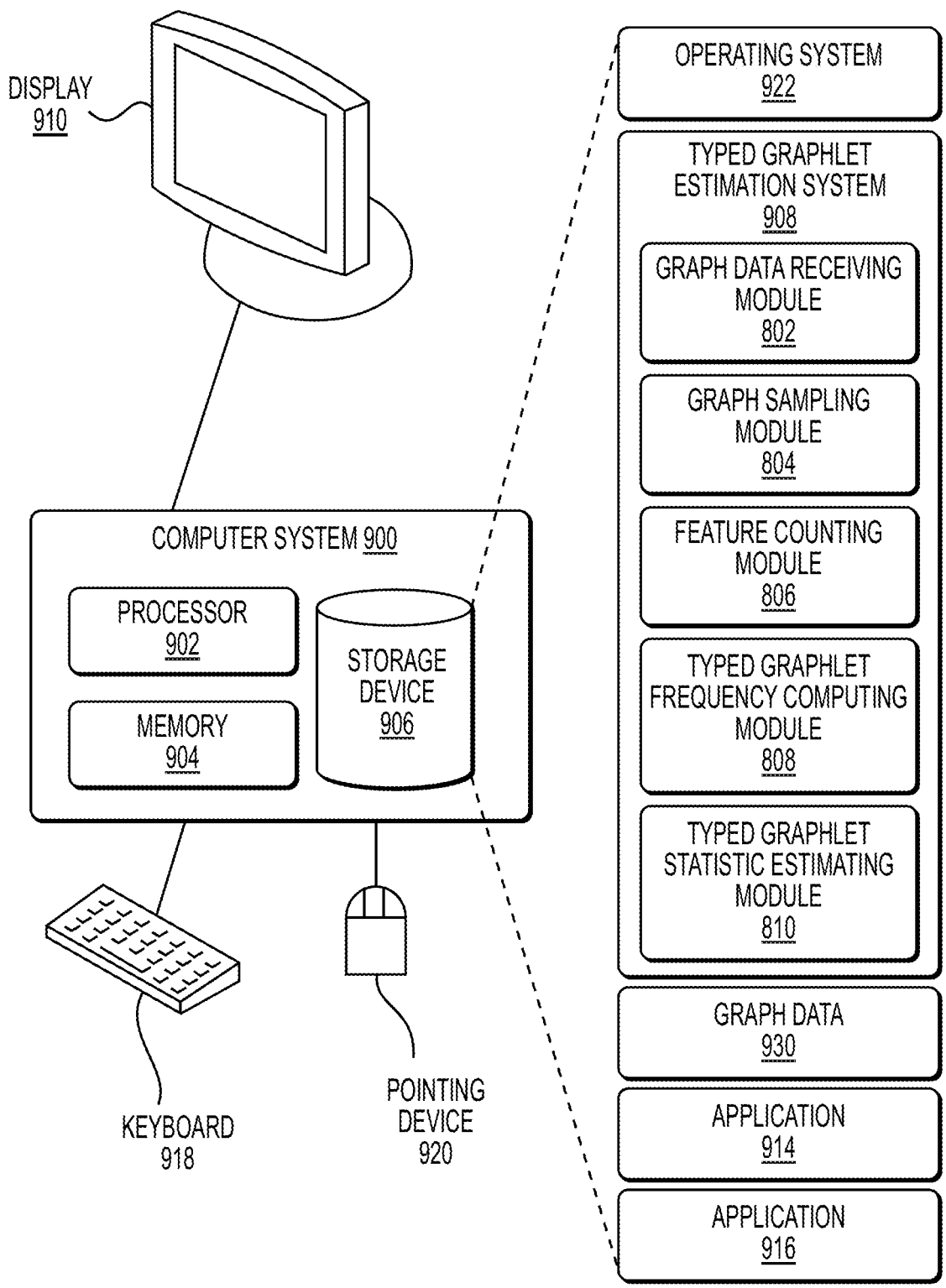
FIG. 9 illustrates an exemplary computer system that may execute the techniques disclosed herein for typed graphlet estimation, according to some embodiments.

FIG. 9 illustrates an exemplary typed graphlet estimation computer system 900, in accordance with some embodiments. In some embodiments, computer system 900 may be a server. In some embodiments, system 900 includes a processor 902, a memory 904, and a storage device 906. In some embodiments, processor 902 may include a set of processors (i.e., processor set 902). Storage device 906 may store a number of applications, such as applications 914 and 916, which may make use of graphlet estimation according to embodiments of the present disclosure, and operating system 922. Storage device 906 may also store typed graphlet estimation system 908 that may include a graph data-receiving module 802, a graph-sampling module 804, a feature-counting module 806, a typed graphlet frequency-computing module 808, and a typed graphlet statistic-estimating module 810. System 900 and/or graph data-receiving module 802 may receive or generate graph data 930 comprising vertices and edges data and may copy graph data to a memory section accessible to typed graphlet estimation system 908. During operation, one or more applications, such as graphlet estimation system 908, are loaded from storage device 906 into memory 904 and then executed by processor set 902. While executing the program, processor set 902 performs the aforementioned functions. System 900 may be coupled to a display 910, a keyboard 918, and a pointing device 920.

In some embodiments, graph data-receiving module 802 can receive data comprising a representation of vertices and edges of a graph. Graph-sampling module 804 may sample edge neighborhoods or other portions of the graph. Feature-counting module 806 may obtain an exact count of graph features in the sampled portions of the graph, for example, k-graphlets such as triangles, 2-stars, 4-cliques, or 4-cycles. Typed graphlet frequency-computing module 808 may compute, based on applying combinatorial relationships to the counted graph features, the occurrence frequency of graphlet patterns in the sampled portions of the graph. Typed graphlet statistic-estimating module 810 may compute a total number of graphlets in the graph, or other graphlet statistics or distributions. Note that graphlet estimation module 202 illustrated in FIG. 2 may provide any and all functions of the various modules depicted in FIG. 9.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method for estimating a total number of typed graphlets in a graph, comprising:
   receiving, by a computer system, a dataset identifying:
      a set of entities corresponding to nodes in the graph;
      edges connecting the nodes in the graph; and
      typed graph features corresponding to types of the nodes and of the edges, respectively, in the graph;
   sampling, by the computer system, a portion of the graph;
   determining, by the computer system, a number of typed graph features in the sampled portion of the graph;
   identifying, by the computer system, a typed graphlet pattern having a combinatorial relationship of the determined number of the typed graph features;
   determining, by the computer system, an occurrence frequency of the typed graphlet pattern in the sampled portion of the graph based on the identifying; and
   determining, by the computer system, an estimation of the total number of typed graphlets in the graph based on the determined occurrence frequency of the typed graphlet pattern in the sampled portion of the graph.

2. The method of claim 1, wherein the types of the nodes in the graph, respectively, include are attributes of corresponding entities of the set of entities including at least one of information relating to a user, a user name, a real name, an affinity of a user, a biography of a user, commercial proclivities of a user, a location, an image, a pointer to a storage location of an image, a webpage, social media content, metadata relating to system activities of a user, or a user alias.

3. The method of claim 1, wherein the determining the number of typed graph features in the sampled portion of the graph includes sampling two nodes connected by an edge in the sampled portion of the graph and corresponding typed edge neighborhoods of the two nodes.

4. The method of claim 1,
   wherein the determining the number of typed graph features in the sampled portion of the graph includes sampling a typed path along one or more edges connecting one or more nodes in the sampled portion of the graph.

5. The method of claim 1, wherein the combinatorial relationship is based on identifying two or more determined typed graph features that form the typed graphlet pattern together.

6. The method of claim 1, further comprising:
   determining a variance in the occurrence frequency by sampling a test portion of the graph; and
   determining whether the variance is within a predetermined error bound.

7. The method of claim 6, further comprising responsive to determining that the variance is not within the predetermined error bound, sampling a subsequent portion of the graph.

8. The method of claim 1, wherein the combinatorial relationship is based on a combination of two or more determined typed graphlets in the sampled portion of the graph that form the typed graphlet pattern.

9. A computer system comprising:
   at least one memory having processor-readable instructions stored therein; and
   at least one processor configured to access the at least one memory and execute the processor-readable instructions to perform operations including:
      receiving a dataset identifying:
         a set of entities corresponding to nodes in a graph;
         edges connecting the nodes in the graph; and
         a plurality of types corresponding to the nodes and of the edges, respectively, in the graph;
      sampling a portion of the graph;
      determining a number of typed graphlets in the sampled portion of the graph;
      identifying a typed graphlet pattern having a combinatorial relationship of the determined number of typed graphlets;

determining an occurrence frequency of the typed graphlet pattern in the sampled portion of the graph based on the identifying; and determining an estimation of a total number of typed graphlets in the graph having the typed graphlet pattern based on the determined occurrence frequency of the typed graphlet pattern in the sampled portion of the graph.

10. The computer system of claim 9, wherein the plurality of types correspond to attributes of the nodes and of the edges in the graph, respectively, the attributes including information relating to at least one of a user, a user name, a real name, an affinity of a user, a biography of a user, commercial proclivities of a user, a location, an image, a pointer to a storage location of an image, a webpage, social media content, metadata relating to system activities of a user, or a user alias.

11. The computer system of claim 9, wherein the determining the number of typed graphlets in the sampled portion of the graph includes sampling two nodes connected by an edge in the sampled portion of the graph and corresponding typed edge neighborhoods of the two nodes.

12. The computer system of claim 9,
wherein the determining the number of typed graphlets in the sampled portion of the graph includes sampling a typed path along one or more edges connecting one or more nodes in the sampled portion of the graph.

13. The computer system of claim 9, the operations further comprising:
determining a variance in the occurrence frequency by sampling a test portion of the graph;
determining whether the variance is within a predetermined error bound; and
responsive to determining that the variance is not within the predetermined error bound, sampling a subsequent portion of the graph.

14. The computer system of claim 9, wherein the determining the number of typed graphlets comprises identifying two or more typed graphlets that share two nodes connected by an edge that form the typed graphlet pattern.

15. The computer system of claim 9, wherein the combinatorial relationship is based on the typed graphlet pattern having more nodes than typed graphlets in the sampled portion of the graph.

16. A non-transitory computer-readable storage medium storing instructions that when executed by a computer cause the computer to perform a method for estimating a total number of typed graphlets in a graph, the method comprising:
receiving a dataset identifying:
a set of entities corresponding to nodes in the graph;
edges connecting the nodes in the graph; and
a plurality of types corresponding to the nodes and the edges, respectively, in the graph, each type of the plurality of types corresponding to a characteristic of a corresponding entity of the set of entities;
sampling a portion of the graph;
determining a number of typed graphlets in the sampled portion of the graph;
identifying a typed graphlet pattern having a combinatorial relationship of the determined number of the typed graphlets;
determining an occurrence frequency of the typed graphlet pattern in the sampled portion of the graph based on the identifying;
determining an estimation of the total number of typed graphlets in the graph based on the determined occurrence frequency of the typed graphlet pattern.

17. The non-transitory computer-readable storage medium of claim 16, wherein the characteristic includes at least one of information relating to at least one of a user, a user name, a real name, an affinity of a user, a biography of a user, commercial proclivities of a user, a location, an image, a pointer to a storage location of an image, a webpage, social media content, metadata relating to system activities of a user, or a user alias.

18. The non-transitory computer-readable storage medium of claim 16, wherein determining the number of typed graphlets in the sampled portion of the graph includes sampling two nodes connected by an edge in the sampled portion of the graph and corresponding typed edge neighborhoods of the two nodes.

19. The non-transitory computer-readable storage medium of claim 16, wherein determining the number of typed graphlets in the sampled portion of the graph includes sampling a typed path along one or more edges connecting one or more nodes in the sampled portion of the graph.

20. The non-transitory computer-readable storage medium of claim 16, wherein the combinatorial relationship is based on the typed graphlet pattern having more nodes than typed graphlets in the sampled portion of the graph.

* * * * *

UNITED STATES PATENT AND TRADEMARK OFFICE
CERTIFICATE OF CORRECTION

| | | |
|---|---|---|
| PATENT NO. | : 11,343,325 B2 | Page 1 of 1 |
| APPLICATION NO. | : 17/008339 | |
| DATED | : May 24, 2022 | |
| INVENTOR(S) | : Ryan A. Rossi, Tung Thanh Mai and Anup Bandigadi Rao | |

It is certified that error appears in the above-identified patent and that said Letters Patent is hereby corrected as shown below:

In the Claims

Column 18, Line 14, after "nodes in the graph", delete ", respectively, include".

Signed and Sealed this
Second Day of August, 2022

Katherine Kelly Vidal
*Director of the United States Patent and Trademark Office*